US009432550B2

(12) United States Patent
Hara et al.

(10) Patent No.: US 9,432,550 B2
(45) Date of Patent: Aug. 30, 2016

(54) SERVER DEVICE, METHOD FOR CONFIGURATION SETTING FOR IMAGE FORMING APPARATUS, AND IMAGE FORMING APPARATUS

(71) Applicant: KYOCERA Document Solutions Inc., Osaka (JP)

(72) Inventors: Nobuhiro Hara, Osaka (JP); Yumi Nakagoshi, Osaka (JP); Ayaka Hontsu, Osaka (JP); Hiroshi Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/499,589

(22) Filed: Sep. 29, 2014

(65) Prior Publication Data

US 2015/0092215 A1    Apr. 2, 2015

(30) Foreign Application Priority Data

Sep. 30, 2013    (JP) ................. 2013-204435

(51) Int. Cl.
*H04N 1/00*    (2006.01)
*H04N 1/32*    (2006.01)

(52) U.S. Cl.
CPC ...... *H04N 1/32539* (2013.01); *H04N 1/32117* (2013.01); *H04N 2201/3253* (2013.01)

(58) Field of Classification Search
CPC .. G06F 3/1211; G06F 3/1236; G06F 3/1287; G06F 3/1204; G06F 3/1226; G06F 3/1288; G06F 3/1292; H04M 1/72572; H04W 4/021; H04L 67/1021; H04L 67/18; H04L 67/16; G06K 15/1807; H04N 1/00087; H04N 1/00037; H04N 1/00244; H04N 2201/0094; H04N 1/32117; H04N 1/32539; H04N 2201/3253
USPC .................................. 358/1.1, 1.13
See application file for complete search history.

(56) References Cited

U.S. PATENT DOCUMENTS 7,792,932 B2    9/2010 Doi et al.
9,154,334 B2   10/2015 Wang (Continued)

FOREIGN PATENT DOCUMENTS

JP      2004-038662 A     2/2004
JP       2004038662   *   2/2004    ............... G06F 3/12

(Continued)

OTHER PUBLICATIONS

English translation for JP 2004038662.*

(Continued)

*Primary Examiner* — Iriana Cruz
(74) *Attorney, Agent, or Firm* — Studebaker & Brackett PC

(57) ABSTRACT

A server device is connected with a plurality of electronic devices in a communicable manner and configures a setting for a desired electronic device out of the plurality of electronic devices. The server device includes a device location management section and a setting determination section. The device location management section acquires location information representing current locations of the electronic devices. The setting determination section refers to settings for other electronic devices, out of the plurality of electronic devices, located at a short distance from the current location of the desired electronic device to determine the setting for the desired electronic device.

9 Claims, 2 Drawing Sheets

(56) References Cited

U.S. PATENT DOCUMENTS

| | | | |
|---|---|---|---|
| 2003/0020968 A1* | 1/2003 | Dan .................... H04N 1/23 358/503 |
| 2004/0080773 A1* | 4/2004 | Jamison ............ G06F 11/0733 358/1.14 |
| 2006/0105714 A1* | 5/2006 | Hall et al. .................... 455/41.3 |
| 2007/0135931 A1 | 6/2007 | Doi et al. |
| 2007/0223028 A1* | 9/2007 | Boyes ................ G03G 15/5004 358/1.14 |
| 2010/0315680 A1* | 12/2010 | Ishikake ............... G06F 3/1208 358/1.15 |
| 2010/0322661 A1* | 12/2010 | Yamamichi ........... G06F 1/3203 399/75 |
| 2012/0191827 A1 | 7/2012 | Wang |
| 2015/0036174 A1* | 2/2015 | Pettis .................... G06F 3/1288 358/1.15 |

FOREIGN PATENT DOCUMENTS

| | | | |
|---|---|---|---|
| JP | 2004358787 | * 12/2004 | .............. B41J 29/38 |
| JP | 2007-158758 A | 6/2007 | |
| JP | 2012-151738 A | 8/2012 | |

OTHER PUBLICATIONS

English translation for JP 2004358787.*

An Office Action; "Notice of Reasons for Rejection," issued by the Japanese Patent Office on Nov. 4, 2015, which corresponds to Japanese Patent Application No. 2013-204435 and is related to U.S. Appl. No. 14/499,589.

An Office Action; "Notice of Reasons for Rejection," issued by the Japanese Patent Office on May 17, 2016, which corresponds to Japanese Patent Application No. 2013-204435 and is related to U.S. Appl. No. 14/499,589.

\* cited by examiner

SERVER DEVICE, METHOD FOR CONFIGURATION SETTING FOR IMAGE FORMING APPARATUS, AND IMAGE FORMING APPARATUS

INCORPORATION BY REFERENCE

The present application claims priority under 35 U.S.C. §119 to Japanese Patent Application No. 2013-204435, filed Sep. 30, 2013. The contents of this application are incorporated herein by reference in their entirety.

BACKGROUND

The present disclosure relates to information processing apparatuses that configure various settings for electronic devices, methods for configuring settings for electronic devices, and electronic devices.

For example, settings (e.g., language being used or toner density) for electronic devices such as copiers that are used all over the world can vary depending on the locations where the electronic devices are used.

SUMMARY

The first embodiment of the present disclosure is an information processing apparatus. The information processing apparatus is connected with a plurality of electronic devices in a communicable manner and configures a setting for a desired electronic device out of the plurality of electronic devices. The information processing apparatus includes a device location management section and a setting determination section. The device location management section acquires location information representing current locations of the electronic devices. The setting determination section determines the setting for the desired electronic device by referring to settings for other electronic devices, out of the plurality of electronic devices, located at a short distance from the current location of the desired electronic device.

The second embodiment of the present disclosure is a method for configuring a setting for a desired electronic device out of a plurality of electronic devices. The configuration method includes: detecting location information representing the current location of the desired electronic device; and determining the setting for the desired electronic device by referring to settings for other electronic devices, out of the plurality of electronic devices, located at a short distance from the current location of the desired electronic device.

The third embodiment of the present disclosure is an electronic device. The electronic device can be connected with an information processing apparatus in a communicable manner and has a setting retention section. A setting of the electronic device is configured by the information processing apparatus. The information processing apparatus refers to settings for other electronic devices located at a short distance from a current location of the electronic device to configure the setting for the electric device. The setting retention section receives and retains the setting configured by the information processing apparatus and transmitted from the information processing apparatus.

DETAILED DESCRIPTION

Figure 1:
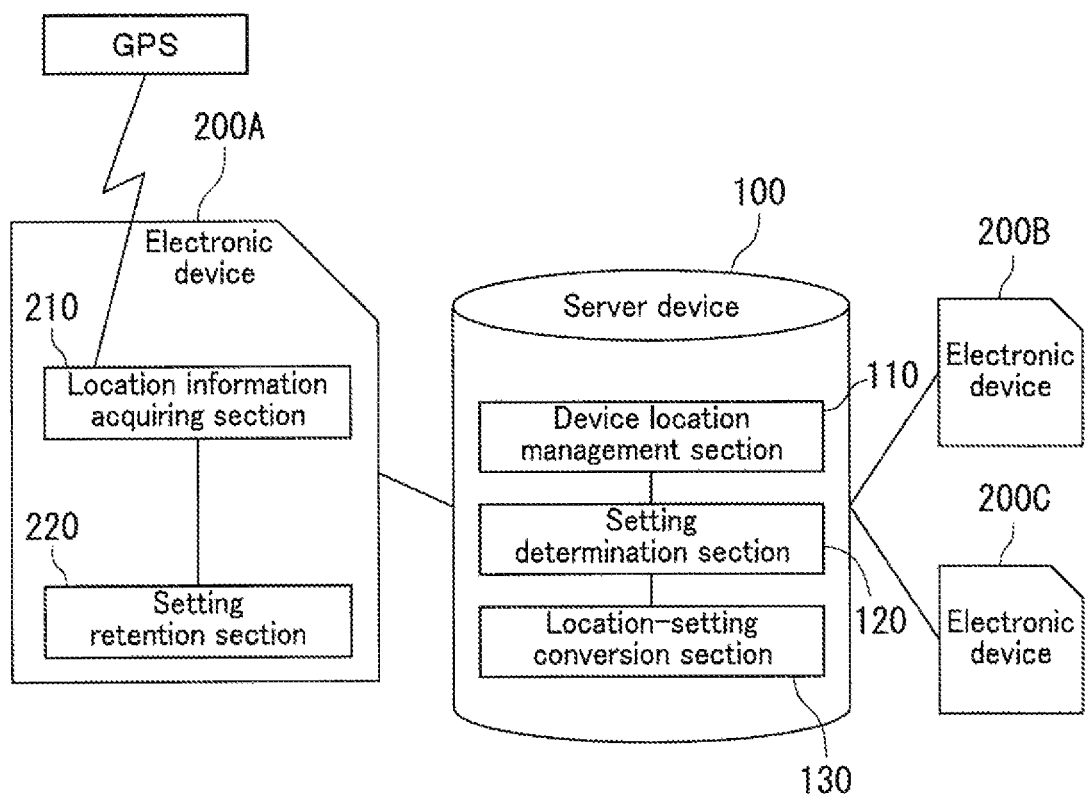
FIG. 1 is a block diagram showing electronic devices and a server device being an information processing apparatus according to an embodiment of the present disclosure.

Hereinafter, embodiments of the present disclosure will be described with reference to the accompanying drawings. FIG. 1 is a block diagram showing electronic devices 200A, 200B, and 200C, and a server device 100 being an information processing apparatus according to an embodiment of the present disclosure.

The electronic devices 200A, 200B, and 200C are connected with the server device 100 in a communicable manner via the internet, for example. In FIG. 1, only the three electronic devices 200A, 200B, and 200C are shown because of space limitations. In practice, however, four or more electronic devices are connected with the server device 100. The number of electronic devices to be connected with the server device 100 is not particularly limited.

The type of the electronic devices (electronic devices 200A, 200B, and 200C, and an electric device(s) not shown) is not particularly limited. For example, the electric devices may be image forming apparatuses that form an image on a recording medium (e.g., recording paper). Examples of the image forming apparatuses include multifunction peripherals (image forming apparatuses having a plurality of functions (e.g., copy function, scan function, and printing function)) and image forming apparatuses having a single function (e.g., copy-only apparatuses). Settings (e.g., language being used or toner density) for the electronic devices (electronic devices 200A, 200B, and 200C, and an electronic device(s) not shown) are configured depending on the locations of the electronic devices (e.g., country or region).

The electronic device 200A includes a location information acquiring section 210 and a setting retention section 220. The location information acquiring section 210 detects the current location of the electronic device 200A through a global positioning system (GPS). The setting retention section 220 includes a semiconductor memory or a non-volatile memory, for example. The setting retention section 220 receives and retains a setting determined by a setting determination section 120 (described later) of the server device 100 and transmitted from the setting determination section 120. The electronic devices other than the electronic device 200A each have the same component parts as the electronic device 200A.

The server device 100 includes a device location management section 110, the setting determination section 120, and a location-setting conversion section 130. The server device 100 functions as an information processing apparatus of the present disclosure.

The device location management section 110 retains location information representing the current locations detected by the location information acquiring sections 210 included in the electronic devices (electronic devices 200A, 200B, and 200C, and an electronic device(s) not shown).

The setting determination section 120 determines a setting for a desired electronic device (e.g., electronic device 200A) by referring to settings for other electronic devices (e.g., electronic devices 200B and 200C) located at a short distance from the current location of the desired electronic device. In the present embodiment, for determining the setting, the setting determination section 120 selects, out of the plurality of electronic devices connected with the server device 100, electronic devices within a predetermined distance (e.g., 10 km) from the current location of the desired electronic device or selects, out of the plurality of electronic devices connected with the server device 100, a predetermined number of (e.g., three) electronic devices in order of increasing distance from the current location of the desired electronic device. For determining the setting, the setting determination section 120 then calculates an average of the settings for the electronic devices selected or chooses a most frequently appearing setting out of the settings for the electronic devices selected.

The location-setting conversion section 130 includes a location-setting conversion table. The location-setting conversion table stores the location information of the electronic devices and the settings therefor. The location information and the settings are associated with one another. The settings stored in the location-setting conversion table are pieces of information preset according to the location information of the electronic devices.

The location-setting conversion section 130 is used when the setting determination section 120 fails to select any electronic devices within the predetermined distance from the current location of the desired electronic device and to select the predetermined number of electronic devices. In that case, the setting determination section 120 refers to the location-setting conversion table included in the location-setting conversion section 130 to select the setting corresponding to the current location of the desired electronic device.

Figure 2:
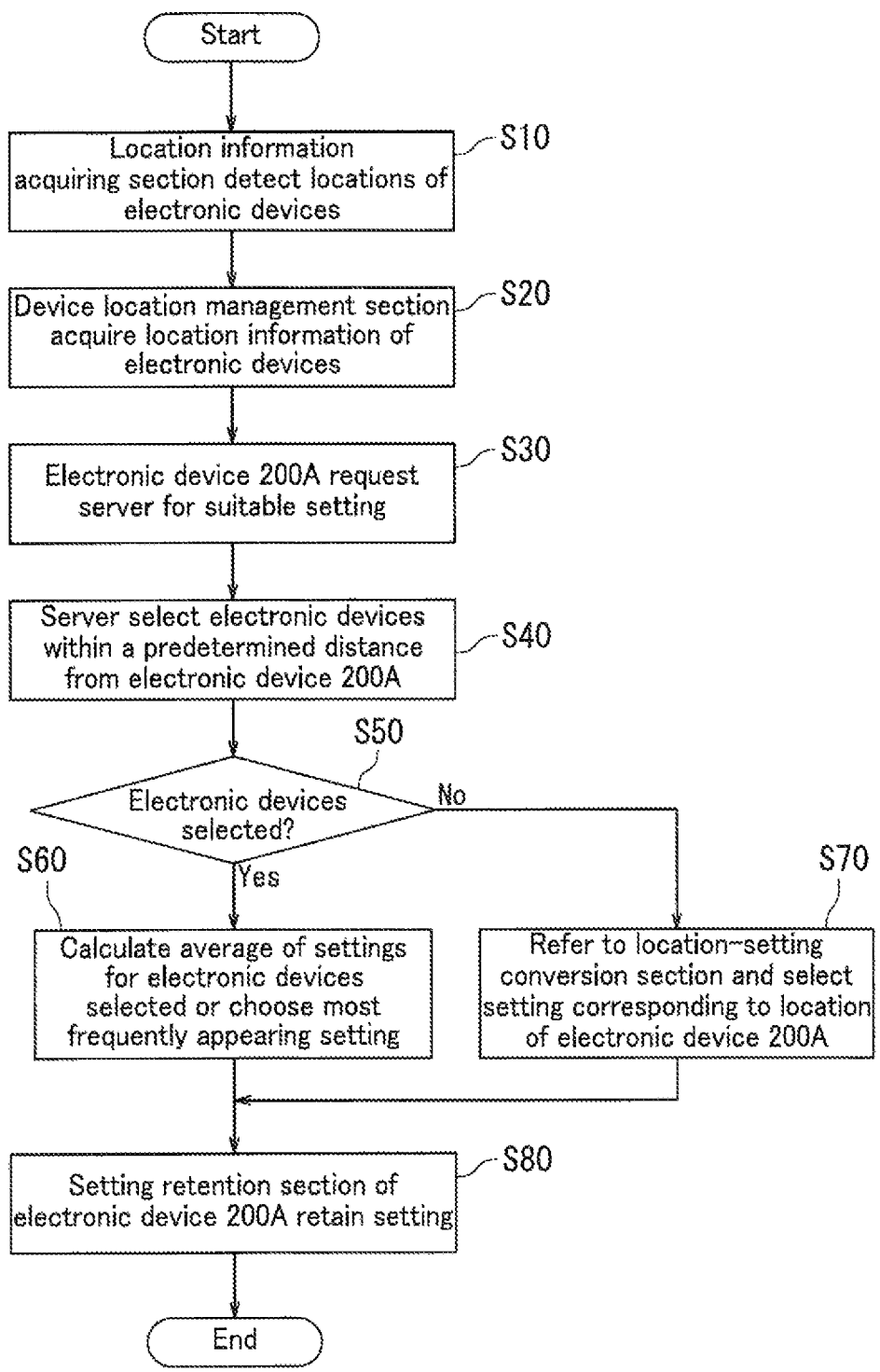
FIG. 2 is a flowchart showing a method for configuring a setting for an electronic device by the information processing apparatus shown in FIG. 1.

Next, a method for configuring a setting for an electronic device will be described with reference to FIG. 2. FIG. 2 is a flowchart showing a method for configuring a setting for an electronic device by the server device 100.

First, in Step S10, the current locations of the electronic devices (electronic devices 200A, 200B, 200C, and an electronic device(s) not shown) are detected by the location information acquiring sections 210 incorporated in the respective electronic devices as shown in FIG. 2.

Next, in Step S20, the device location management section 110 of the server device 100 acquires information of the locations of the respective electronic devices. Next, in Step S30, the electronic device 200A makes a request to the server device 100 for a setting suitable for the current location of the electronic device 200A.

Next, in Step S40, the server device 100 refers to the information acquired by the device location management section 110 to select electronic devices within a predetermined distance from the current location of the electronic device 200A.

Next, in Step S50, it is determined whether or not any electronic devices within the predetermined distance from the current location of the electronic device 200A have been selected.

When some electronic devices within the predetermined distance from the current location of the electronic device 200A have been selected in Step S50 (YES), then an average of the settings for the electronic devices selected is calculated or a most frequently appearing setting of the settings for the electronic devices selected is chosen in Step S60. Although the case where the server device 100 selects electronic devices within a predetermined distance (e.g., 10 km) from the current location of the electronic device 200A is described in Step S40 of FIG. 2, the server device 100 may select a predetermined number of (e.g., three) electronic devices in order of increasing distance from the current location of the electronic device 200A.

That is, when the settings are numerical values, an average of the settings is calculated. For example, when the settings are toner densities, the average of the toner densities is calculated. When the settings are not numerical values, a most frequently appearing setting is chosen. For example, when the settings are languages being used, a most frequently used language is chosen out of the languages being used in the electronic devices selected.

When there are two or more most frequently appearing settings, all the most frequently appearing settings may be displayed on a display section of the electronic device 200A so that a user can select a desired setting. The average calculated or the most frequently appearing setting chosen is transmitted to the electronic device 200A.

When the setting determination section 120 fails to select any electronic devices within the predetermined distance from the current location of the electronic device 200A in Step S50 (NO), then the server device 100 refers to the location-setting conversion table included in the location-setting conversion section 130 and selects the setting corresponding to the current location of the electronic device 200A in Step S70. The setting selected is transmitted to the electronic device 200A.

Next, in Step S80, the setting retention section 220 of the electronic device 200A retains, as a new setting, the average or the most frequently appearing setting obtained in Step S60, or the setting selected in Step S70.

As described above, the server device 100 configures the most suitable settings for an electronic device according to the current location of the electronic device. Accordingly, a user of the electronic device does not need to manually adjust the settings. Thus, the user's labors can be reduced, and the configuration of the settings according to the location where the electronic device is used can be accurate.

So far, the specific embodiments of the present disclosure have been described with reference to FIGS. 1 and 2; however, the present disclosure is not limited to the embodiments, and various alterations can be made to the embodiments.

For example, the information processing apparatus may be a device other than a server device (e.g., a personal computer or a workstation).

The electronic devices may be devices other than image forming apparatuses (e.g., home electric appliances).

The setting to be configured according to the location where the electronic device is used may be a setting other than the toner density or the language being used. For example, the setting may be the fixing temperature or the fixing pressure of a fixing device that fixes a toner image on a recording medium (e.g., recording paper)). In this case, the fixing temperature can be set to be higher in a cold climate region.

Various other alterations can be made to the embodiments within the scope not departing from the gist of the present disclosure.

What is claimed is:

1. A server device that is connected with a plurality of image forming apparatuses in a communicable manner and configures a setting for a desired image forming apparatus out of the plurality of image forming apparatuses, the server device comprising:
   a device location management section configured to acquire location information representing current locations of the plurality of image forming apparatuses; and
   a setting determination section configured to refer to settings for other image forming apparatuses, out of the plurality of image forming apparatuses, located at a short distance from the current location of the desired image forming apparatus to determine the setting for the desired image forming apparatus, wherein the setting determination section selects, out of the plurality of image forming apparatuses, at least one of image forming apparatuses within a predetermined distance from the current location of the desired image forming apparatus and a predetermined number of image forming apparatuses in order of increasing distance from the current location of the desired image forming apparatus, when settings for the image forming apparatuses selected include numerical values, the setting determination section calculates an average of the numerical values included in the settings, and when the settings include non-numerical values, the setting determination section chooses a most frequently appearing setting out of the settings.

2. A server device according to claim 1 further comprising:

a location-setting conversion section configured to store the location information of the image forming apparatuses and settings preset according to the location information, wherein in the case of failure to select any image forming apparatuses within the predetermined distance and to select the predetermined number of image forming apparatuses, the setting determination section refers to information included in the location-setting conversion section to select a setting corresponding to the current location of the desired image forming apparatus.

3. A server device according to claim 1, wherein the settings include settings of languages being used in the image forming apparatuses.

4. A method for configuring a setting for a desired image forming apparatus out of a plurality of image forming apparatuses, comprising:

detecting location information representing a current location of the desired image forming apparatus; and determining the setting for the desired image forming apparatus by referring to settings for other image forming apparatuses, out of the plurality of image forming apparatuses, located at a short distance from the current location of the desired image forming apparatus, wherein the determining the setting includes selecting, out of the plurality of image forming apparatuses, at least one of image forming apparatuses within a predetermined distance from the current location of the desired image forming apparatus and a predetermined number of image forming apparatuses in order of increasing distance from the current location of the desired image forming apparatus, and calculating, when settings for the image forming apparatuses selected include numerical values, an average of the numerical values included in the settings and choosing a most frequently appearing setting out of the settings when the settings include non-numerical values.

5. A method according to claim 4, comprising:

selecting a setting corresponding to the current location of the desired image forming apparatus by referring to information included in a location-setting conversion section in the case of failure to select any image forming apparatuses within the predetermined distance and to select the predetermined number of image forming apparatuses, the location-setting conversion section storing location information of the image forming apparatuses and settings preset according to the location information.

6. An image forming apparatus that can be connected with a server device in a communicable manner and has a setting retention section, wherein a setting of the image forming apparatus is configured by the server device, the server device refers to settings for other image forming apparatuses located at a short distance from a current location of the image forming apparatus to configure the setting for the image forming apparatus, the setting retention section receives and retains the setting configured by the server device and transmitted from the server device, and for configuring the setting, the server device:

selects at least one of image forming apparatuses within a predetermined distance from the current location of the image forming apparatus and a predetermined number of image forming apparatuses in order of increasing distance from the current location;

when settings for the image forming apparatuses selected include numerical values, calculates an average of the numerical values included in the settings; and when the settings include non-numerical values, chooses a most frequently appearing setting out of the settings.

7. A server device according to claim 1, wherein the setting for the desired image forming apparatus is a fixing temperature of a fixing device, and the fixing temperature is set to be higher in a situation in which the current location of the desired image forming apparatus is a cold climate region.

8. A server device according to claim 1, wherein the settings include numerical values indicating toner density.

9. A server device according to claim 1, wherein the settings include non-numerical values indicating language.

* * * * *